United States Patent [19]
Matsueda

[11] Patent Number: 5,181,196
[45] Date of Patent: Jan. 19, 1993

[54] ERASE MARK DETECTING CIRCUIT FOR DETECTING AN ERASE MARK SUPERIMPOSED ON DATA RECORDED ON A SECTOR OF AN OPTICAL RECORDING MEDIUM

[75] Inventor: Akira Matsueda, Hachioji, Japan

[73] Assignee: Olympus Optical Co., Ltd., Tokyo, Japan

[21] Appl. No.: 675,617

[22] Filed: Mar. 27, 1991

[51] Int. Cl.[5] .......... G11B 5/09; G11B 15/52; G11B 20/12; G11B 27/22

[52] U.S. Cl. .................. 369/48; 369/116

[58] Field of Search .......... 369/116, 48, 100, 32, 369/54, 58, 124, 59, 121; 358/342

[56] References Cited
U.S. PATENT DOCUMENTS

| | | | |
|---|---|---|---|
| 4,308,612 | 12/1981 | Miyauchi et al. | 369/48 |
| 4,606,016 | 8/1986 | Verboom et al. | 369/54 |
| 4,663,752 | 5/1987 | Kakuse et al. | 369/54 |
| 4,831,611 | 5/1989 | Sasaki et al. | 369/116 |
| 4,932,014 | 6/1990 | Tamiya | 369/48 |

Primary Examiner—Tommy P. Chin
Assistant Examiner—Thai Tran
Attorney, Agent, or Firm—Stevens, Davis, Miller & Mosher

[57] ABSTRACT

An erase mark detecting circuit and an optical information recording/reproducing apparatus in which the erase mark detecting circuit is applied in a suitable manner, in which an erase mark is superimposed on a predetermined portion of an information unit, such as information track and information sector, the erase mark is detected in accordance with a mean level of a data reproducing signal of the erase mark superimposed region and an existence of information data recorded on said predetermined portion. Therefore, according to the invention, the erase mark can be detected in a correct and stable manner without being influenced by the content of the information data recorded on the information unit or the recording method of the information data.

21 Claims, 6 Drawing Sheets

FIG_1A
PRIOR ART
FIG_1B
PRIOR ART
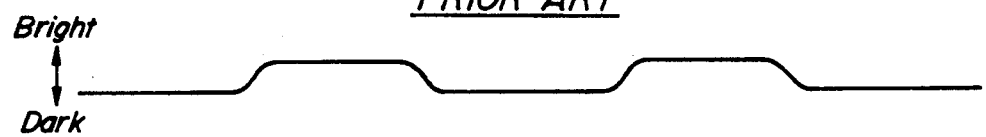
FIG_2
PRIOR ART
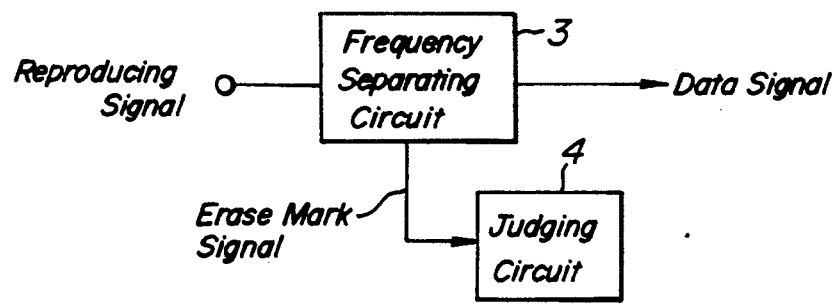
FIG_3A
PRIOR ART
FIG_3B
PRIOR ART

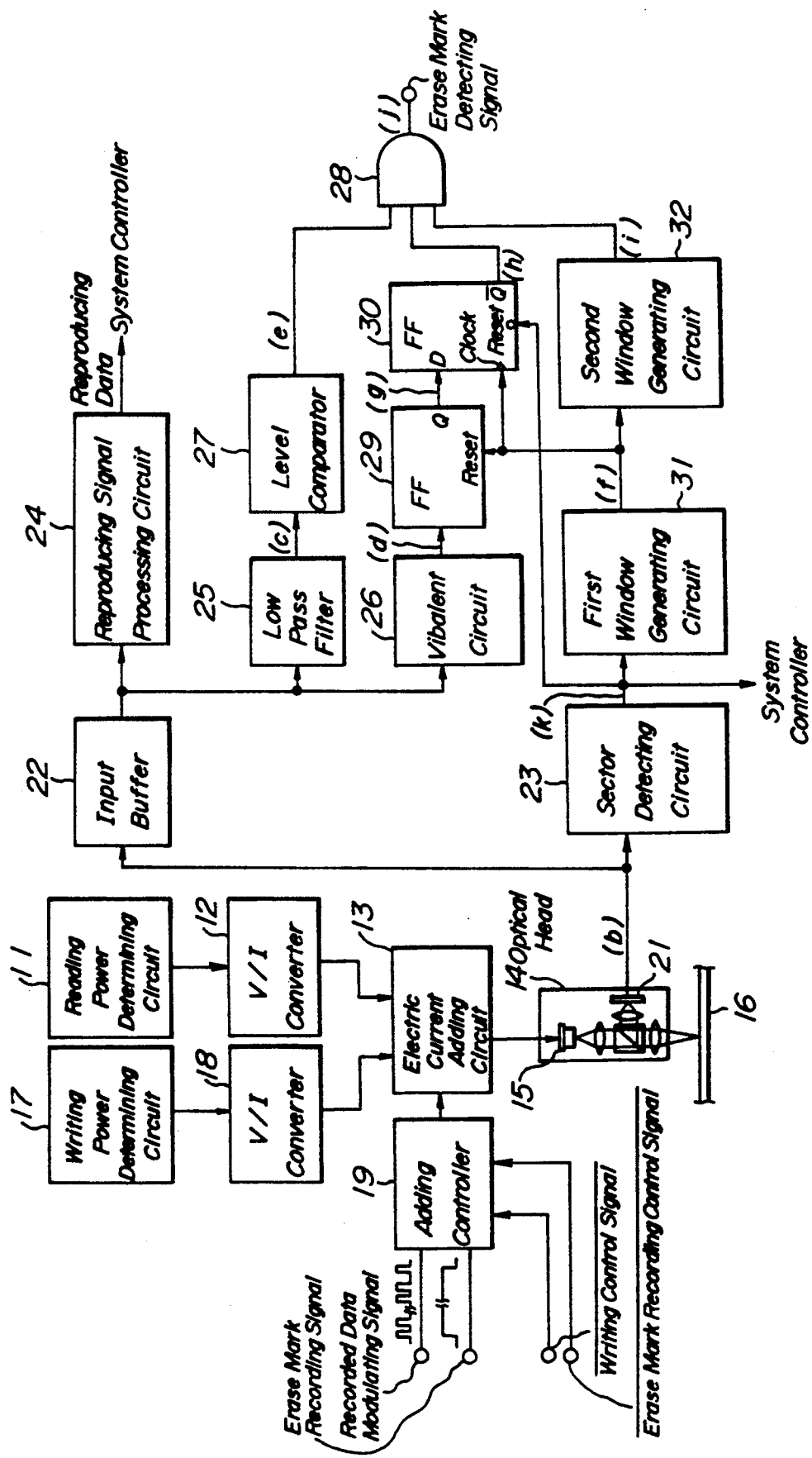
FIG_4

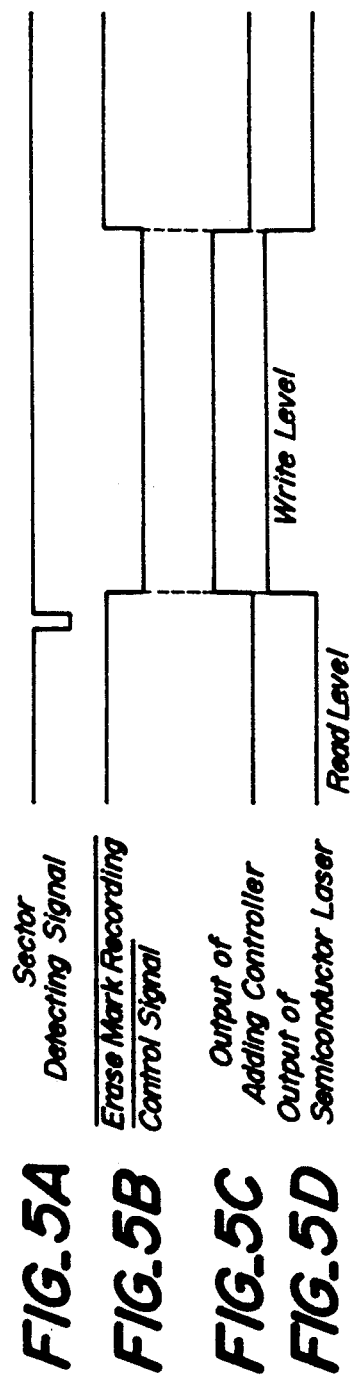

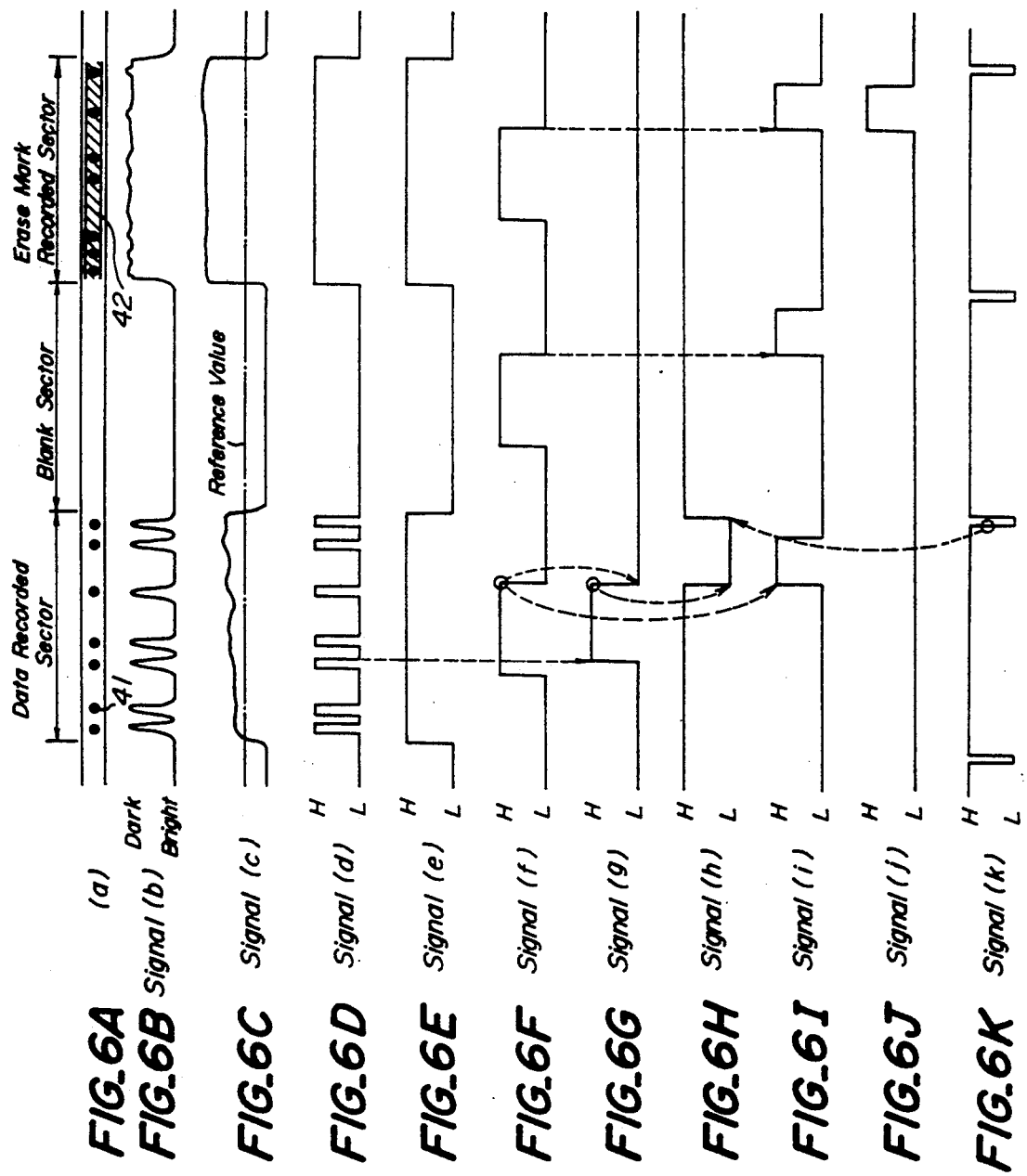

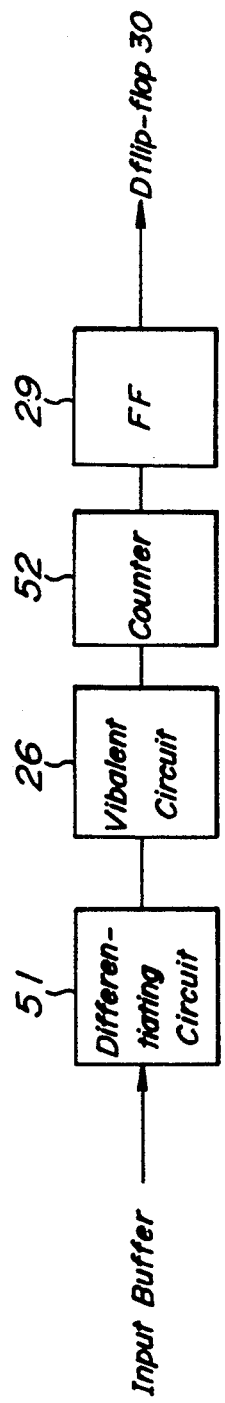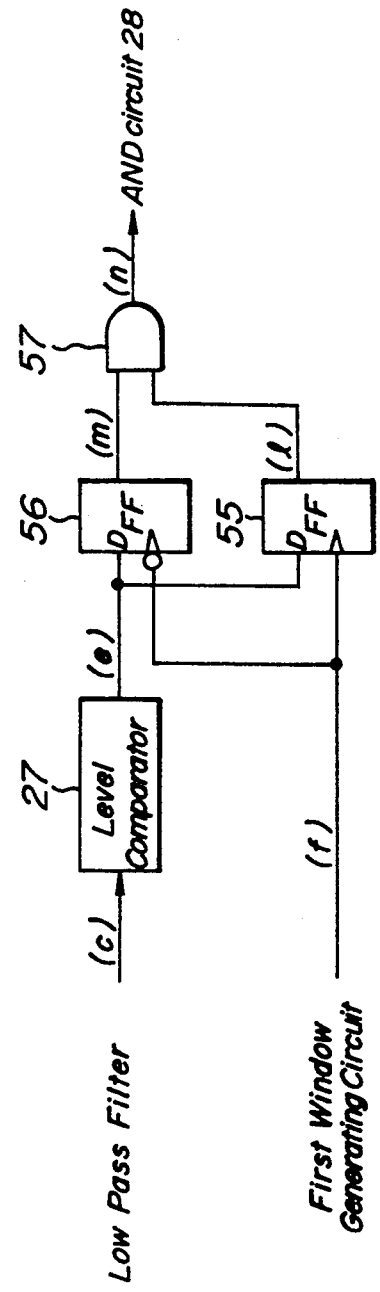

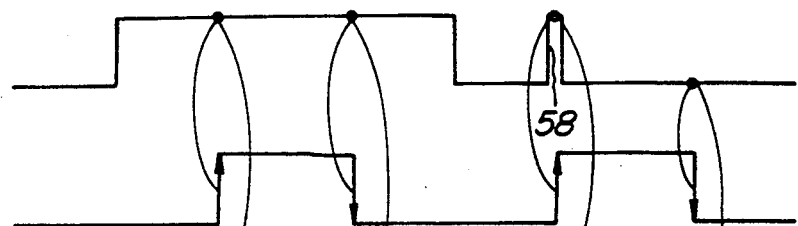
FIG_9A Signal (e)
FIG_9B Signal (f)
FIG_9C Signal (ℓ)
FIG_9D Signal (m)
FIG_9E Signal (n)
FIG_9F Signal (i)

ERASE MARK DETECTING CIRCUIT FOR DETECTING AN ERASE MARK SUPERIMPOSED ON DATA RECORDED ON A SECTOR OF AN OPTICAL RECORDING MEDIUM

BACKGROUND OF THE INVENTION

1. Field of the Invention

The present invention relates to an erase mark detecting circuit and an optical information recording/reproducing apparatus in which the erase mark detecting circuit can be applied in a suitable manner. In the information recording/reproducing apparatus according to the invention, an erase mark for erasing an information data recorded on a data area of an information recording medium, such as an optical card and optical disc, is superimposed on the information data recorded area and the erase mark superimposed on the information data recorded area can be detected by the erase mark detecting circuit in a correct and stable manner.

2. Prior Art Statement

In an optical information recording/reproducing apparatus, in which a non-rewritable information recording medium, such as an optical disc and an optical card, is used, when a defect exists on the data area of the information recording medium an erase mark should be recorded on the data area having the defect, so as not to reproduce the information data recorded thereon. Additionally, for the purpose of keeping a secret, such erase mark is also recorded on the data area, which is no longer necessary.

In Japanese Patent Publication No. 63-3379, a conventional erase mark detecting circuit is disclosed. In the conventional circuit, the erase mark 2 is recorded on the data area, on which an information data has been already recorded with the aid of data pits 1, as shown in FIG. 1A, by superimposing a signal having a low frequency band on the data area. The erase mark 2 is detected when the information data recorded on the data area is reproduced in the optical information recording/reproducing apparatus, such that the information data reproducing signal is supplied to a frequency separating circuit 3, which comprises a low pass filter, etc, to derive a low frequency component of the information data reproducing signal. FIG. 1B is a schematic view showing the low frequency component of the information data reproducing signal. In the conventional circuit, the output of the frequency separating circuit 3 is supplied to a judging circuit 4 for judging an existence of the low frequency component in the output. FIG. 2 is a block diagram showing the conventional erase mark detecting circuit.

However, in the conventional erase mark detecting circuit, there is a problem that the erase mark is sometimes detected erroneously. The erroneous detection of the erase mark depends on the contents of the recorded information data or the recording method which was used in recording the information data on the data area. For instance, in the case that the information data is recorded in MFM modulating system with the aid of data pits, long and short distances between the data pits may be repeatedly formed on the data area with some frequency, as shown in FIG. 3A. However if the frequency of the long and short distances is similar to the frequency component of the erase mark, the same frequency component as that shown in FIG. 1B would be detected in the frequency separating circuit 3 from the information data reproducing signal; and the low frequency component would be supplied to the judging circuit 4. In the judging circuit 4, it is impossible to judge the low frequency component of the information data reproducing signal from that of the erase mark signal, so that the erase mark is erroneously detected from the data area on which the erase mark has not been recorded.

SUMMARY OF THE INVENTION

The present invention has for its object to provide an erase mark detecting circuit, by which the erase mark can be detected in a correct and stable manner without being influenced by the content of the information data recorded on the data area or the recording method used for recording the information data on the data area.

In order to carry out this object, the erase mark detecting circuit according to the invention comprises:

a level detecting means for detecting a mean level of said information data reproducing signal corresponding to a predetermined portion of an information recording area of the optical information recording medium;

an information data detecting means for detecting the fact that an information data is recorded at the predetermined portion of the information recording area; and an erase mark detecting means for detecting an erase mark superimposed on the predetermined portion of the information recording area in accordance with outputs of said level detecting means and said information data detecting means.

The present invention has for its another object to provide an optical information recording/reproducing apparatus for which the erase mark detecting circuit is applied in a suitable manner, comprises:

an optical head comprising a semiconductor laser for producing a light beam for recording/reproducing optical information on an optical information recording medium and a photodetector by which a reflection light beam reflected by the optical information recording medium is detected to produce an information data reproducing signal a power determining means for determining a power of the light beam emanated from the semiconductor laser;

an erase mark detecting means comprising a level detecting means for detecting a mean level of said information data reproducing signal; an information data detecting means for detecting the fact that an information data is recorded on the information recording area of the information recording medium; and an erase mark detecting means for detecting an erase mark superimposed on the information recording area in accordance with outputs of said level detecting means and said information data detecting means.

According to the present invention, by detecting the mean level of the information data reproducing signal, the data recorded area of the information unit and the erase mark recorded area of the information unit can be distinguished from the blank information unit; and by detecting the existence of the information data on the information unit, the data recorded area of the information unit can be distinguished from the erase mark recorded area of the information unit and the blank information unit. Therefore, it is possible to detect the erase mark by combining the output of the mean level detecting means for detecting the mean level of the information data reproducing signal and the output of the information data detecting means for detecting the existence of the information data on the information unit.

BRIEF DESCRIPTION OF THE DRAWINGS

FIG. 1A is a schematic view showing data pits and erase marks formed on a data recording area of an information recording medium; and FIG. 1B is a schematic view depicting an information data reproducing signal corresponding to the data pits and erase marks shown in FIG. 1A;

FIG. 2 is a block diagram representing a conventional erase mark detecting circuit;

FIG. 3A is a schematic view illustrating an example of data pits formed on the data recording area of the information recording medium; and FIG. 3B is a schematic view showing an information data reproducing signal corresponding to the data pits illustrated in FIG. 3A;

FIG. 4 is a block diagram depicting an embodiment of an optical information recording/reproducing apparatus according to the invention for which an erase mark detecting circuit is applied;

FIGS. 5A to 5D are schematic views illustrating waveforms of signals supplied to an adding controller when the erase mark is recorded;

FIGS. 6A to 6J are schematic views representing waveforms of signals supplied to the elements constituting the erase mark detecting circuit according to the invention;

FIG. 7 is a block diagram illustrating a modification of the erase mark detecting circuit depicted in FIG. 4;

FIG. 8 is a block diagram representing another modification of the erase mark detecting circuit depicted in FIG. 4; and FIGS. 9A to 9F are schematic views showing waveforms of signals supplied to the elements constituting the modification represented in FIG. 8.

DETAILED EXPLANATION OF THE PREFERRED EMBODIMENTS

FIG. 4 is a block diagram showing an embodiment of the optical information recording/reproducing apparatus, in which the erase mark detecting circuit according to the invention is applied. In the optical information recording medium used in this embodiment, a sector unit is used as an information recording unit; and when an erase mark is recorded on the sector unit, the erase mark is superimposed on through over the sector except on a sector mark, which represents that the sector is started therefrom.

In the apparatus, an output of a reading power determining circuit 11 is supplied to a V/I converting circuit 12 to be converted to an electric current, and the electric current is then supplied to a semiconductor laser 15 of an optical head 14 via an electric current adding circuit 13. In accordance with an output of the electric current adding circuit 13, a light beam having a reading power is emanated from the semiconductor laser 15 to be made incident upon a surface of an optical information recording medium 16, such as an optical disc, an optical card and an optomagnetic disc.

On the other hand, an output of a writing power determining circuit 17 is supplied to the electric current adding circuit 13 via a V/I converting circuit 18, and then the output of the V/I converting circuit 18 is added to the output of the V/I converting circuit 12 in accordance with an output of an adding controller 19. In accordance with the output of the electric current adding circuit 13, in which the outputs of the V/I converting circuits 12 and 18 are added, a light beam having a writing power is emanated from the semiconductor laser 15 to record desired information on the surface of the optical recording medium 16.

When the information data is recorded on the optical information recording medium 16, to the adding controller 19 is supplied a modulated signal of the information data; when an erase mark is recorded on the data area, an erase mark recording signal having a high signal level is supplied; and anyone of these signals is selected in the adding controller 19 to be supplied to the electric current adding circuit 13 in accordance with a writing control signal and an erase mark recording control signal, which are supplied from a system controller (not shown) to the adding controller 19. In the electric current adding circuit 13, it is arranged such that during when the output of the adding controller 19 is high, the output of the V/I converting circuit 18 is added to the output of the V/I converting circuit 12 and the sum of them is supplied to the semiconductor laser 15 to emanate the light beam having a writing power therefrom.

On the other hand, an analog reproducing signal is produced in a photodetector 21, by which a reflection light beam reflected by the information recording medium 16 is detected, and the analogue reproducing signal is supplied to an input buffer 22 and a sector detecting circuit 23, respectively. An output of the input buffer 22 is supplied to a reproducing signal processing circuit 24, a low pass filter 25 and a bivalent circuit 26, respectively. In the reproducing signal processing circuit 24, a bivalent signal corresponding to the information data is obtained from the analog reproducing signal to be supplied to the system controller. In the low pass filter 25, a mean level of the analog reproducing signal is detected. Additionally, in the bivalent circuit 26, a recorded information data component of the analog reproducing signal is converted to a bivalent signal. An output of the low pass filter 25 is supplied to a level comparator 27 to be compared with a reference value to judge a mean level of the output of the low pass filter 25. The judgement result is further supplied to an AND circuit 28. An output of the bivalent circuit 26 is supplied to a flip-flop 29, which is arranged such that the flip-flop 29 is set at a trailing edge of the output of the bivalent circuit 26; an output Q of the flip-flop 29 is supplied to a D terminal of a D flip-flop 30; and a output $\bar{Q}$ of the D flip-flop 30 is supplied to the AND circuit 28.

In the sector detecting circuit 23, a sector mark, which is formed at a top end portion of each sector, is detected from the analog reproducing signal of the photo detector 21; and a sector detecting signal is supplied to the system controller and a first window generating circuit 31, respectively. In the first window generating circuit 31, a first window signal which becomes high at a given portion of each setctor, i.e. an intermediate portion of each sector, is generated, responding to the sector detecting signal. The output of the first window generating circuit 31 is supplied to a reset terminal of the flip-flop 29, a clock terminal of the D flip-flop 30 and a second window generating circuit 32, respectively. Therefore, in the flip-flop 29, the output Q becomes high, being synchronized with a first trailing edge of the output of the bivalent circuit 26 during when the output of the first window generating circuit 31 is high level; and such condition is kept until the output of the first window generating circuit 31 becomes low level.

In the D flip-flop 30, the output Q of the flip-flop 29 is kept at the time of the trailing edge of the output of the first window generating circuit 31; and the sector detecting signal (k) is supplied to a reset terminal of the D flip-flop 30. Therefore the D flip-flop 30 is reset when the sector mark of each sector is detected in the sector detecting circuit 23. In the second window generating circuit 32, a second window signal, whose signal level becomes high for a given period in each sector, is generated being synchronized with the trailing edge of the output of the first window generating circuit 31; and the output of the second window generating circuit 32 is also supplied to the AND circuit 28. In such manner, an erase mark detecting signal having a high level is obtained from the AND circuit 28 when the erase mark recorded on the sector is present in the data recorded sector.

An operational function of this embodiment will be explained in the following.

First, when the information data is recorded on the optical information recording medium 16, a writing control signal is supplied to the adding controller 19 from the system controller being synchronized with a sector detecting signal, which represents that a desired sector is detected thereby; in the adding controller 19 a modulated signal for the information data to be recorded is selected to be supplied to the electric current adding circuit 13. In the electric current adding circuit 13, when the modulated signal having a high level is supplied, the output of the V/I converting circuit 18 is added to the V/I converting circuit 12 to let the incident light beam of the semiconductor laser 15 have a writing power; and the information data is recorded on the relevant sector of the recording medium 16.

Second, when the erase mark is recorded on the sector on which the information data has been already recorded, an erase mark recording control signal is supplied to the adding controller 19 from the system controller being synchronized with the sector detecting signal, which represents the sector to be erased is detected. FIG. 5 shows waveforms of the sector detecting signal, the erase mark recording control signal, the output of the adding controller 19 and the output of the semiconductor laser 15 when the erase mark is recorded on the sector to be erased. In the adding controller 19, in response to the erase mark recording control signal, an erase mark recording signal having a high level, which corresponds to almost all over the relevant sector except the sector mark, is selected to be supplied to the electric current adding circuit 13. In the electric current adding circuit 13, when the erase recording signal having a high level is supplied thereto, the output of the V/I converting circuit 18 is added to the V/I converting circuit 12 to superimpose the erase mark, i.e. incident light beam of the semiconductor laser 15 having a writing power, on the relevant sector.

Next, the operational function to detect the erase mark out of the data recorded sector on which the information data has been recorded, the erase mark recorded sector on which the erase mark has been superimposed on the data recorded sector, and the blank sector on which neither the information data nor the erase mark is recorded, will be explained in the following, with reference to FIG. 6. It should be noted that the waveforms shown in FIGS. 6B to 6K correspond to waveforms of outputs shown by the references (b) to (k) in FIG. 1, respectively.

When the information data recorded on the information recording medium 16 is read out by the laser beam having a reading power emanated from the semiconductor laser 15, an analogue reproducing signal as shown in FIG. 6B is obtained from the photo dectector 21. The waveform of the analogue reproducing signal is varied in accordance with the type of the sector. That is to say, the waveform of the analogue reproducing signal varies depending upon the type of the sector, i.e. the data recorded sector, the blank sector or the erase mark recorded sector. It should be noted that the sector mark of each sector is omitted in FIG. 6A.

The analogue reproducing signal is supplied to a low pass filter 25 to remove the high frequency component therefrom. The waveform, in which the high frequency component is removed, of the output of the low pass filter 25, i.e. signal (c) is shown in FIG. 6C. The analogue reproducing signal is also supplied to the bivalent circuit 26 to obtain a bivalent signal as shown in FIG. 6D. The output of the low pass filter 25 is supplied to the level comparator 27 to be compared with a reference value, which is shown in FIG. 6C; and the output of the level comparator 27 is supplied to an AND circuit 28. It should be noted that the reference value should be determined so as to be between the output level of the low pass filter 25 on the data recorded sector and the output level of the low pass filter on the blank sector. Therefore, a level judgement signal (e), which becomes high in response to the data recorded sector and the erase mark recorded sector but becomes low in response to the blank sector, can be obtained in the level comparator 27, as shown in FIG. 6E.

On the other hand, in a first window generating circuit 31, the first window signal (f) is generated being synchronized with the sector detecting signal (k), which is detected by the sector detecting circuit 23. The first window signal becomes high level at an intermediate portion of each sector and the high level thereof is kept for a predetermined period as shown in FIG. 6F. Since the first window signal is supplied to the reset terminal of the flip-flop 29, the output of the flip-flop 29 becomes high level during the period that the first window signal is high in the data recorded sector, as shown in FIG. 6G. The signal condition of the output of the flip-flop 29 is kept in the D flip-flop 30 at a trailing edge of the first window signal, so that the output $\bar{Q}$ of the D flip-flop 30 becomes low level as shown in FIG. 6H. Since the output of the sector detecting circuit 23 is supplied to the reset terminal of the D flip-flop 30, the D flip-flop 30 is reset at the top end portion of each sector in responding to the sector detecting signal (k) generated in the sector detecting circuit 23.

In the second window generating circuit 32, the second window signal (i) is generated being synchronized with the trailing edge of the first window signal, which is supplied from the first window generating circuit 31. The second window signal becomes high level for a predetermined period in each sector; and the second window signal is supplied to the AND circuit 28.

Therefore, to the AND circuit 28, there are supplied the level judgment signal (e) (FIG. 6E) from the level comparator 27, the output $\bar{Q}$ (h) from the D flip-flop 30 (FIG. 6H) and the second window signal (i) (FIG. 6I) from the second window generating circuit 32; and thus an erase mark detecting signal (j) can be obtained from the AND circuit 28 (FIG. 6J), which becomes high during when the second window signal becomes high on the erase mark recorded sector.

The present invention is not limited to the above explained embodiment, and many variations or many modifications can be applied therefor. For example, in the above embodiment, the information data recorded on the sector is detected with the aid of the bivalent circuit 26, but it may be possible to be arranged such that the analogue reproducing signal supplied from the input buffer 22 is supplied to a differentiating circuit 51 to be differentiated thereby; the output of the differentiating circuit 51 is supplied to the bivalent circuit 26 to be converted into the bivalent signal; and the bivalent signal is then supplied to a counter 52, in which the number of the bivalent signals are counted up and when the counted number of the bivalent signal becomes to a given number, the recorded data detecting signal is supplied to the flip-flp 29. In such arrangement, it is possible to remove the unnecessary frequency component, such as noise component, in an efficient manner by determining a preferred time constant in the differentiated circuit 51. Further to this, even if the information recording data remains in the area where the erase mark is superimposed on, it is possible to certainly prevent the erroneous detection of the erase mark, because the counter 52 serves to remove the left over information recorded data in an effective manner. It is preferred to start to count the number of the bivalent signal in the counter 52 when the first window signal generated in the first window generating circuit 31 is high level. It should be noted that such functional effect can be carried out by using a band pass filter, through which only the frequency component of the information recording data is passed, instead of the differentiating circuit 51.

In the above explained embodiment, the output of the level comparator 27 is directly supplied to the AND circuit 28. However, it may be possible to arrange such that the output of the level comparator is supplied to D terminals of flip-flops 55 and 56, respectively, as shown in FIG. 8; the first window signal is supplied to clock terminals of the flip-flops 55 and 56, respectively; the output of the level comparator 27 is kept in the D flip-flops 55 and 56 at the leading and trailing edges of the first window signal, respectively; and the outputs (l) and (m) of the D flip-flops 55 and 56 are supplied to the AND circuit 28 via an AND circuit 57. The D flip-flops 55 and 56 are arranged to be made clear at the leading edge of the sector detecting signal or at the leading edge of the second window signal generated in the second window signal generating circuit 32. In such arrangement, it is possible to prevent the erroneous detection of the erase mark in an effective manner, even if a non-desired signal 58 is generated due to a defect or dust formed on the recording medium, as shown in FIG. 9. It should be noted that the characters representing the respective waveforms in FIG. 9 correspond to the characters representing the signals used in FIGS. 6 and 8.

Furthermore, in the embodiment mentioned in the above, the sector unit is used as an information unit, however, even if a track unit is used as the information unit instead of the sector unit, the present invention is effectively applied therefor. Moreover, when the erase mark is recorded on a predetermined one part of the information unit, the present invention can be applied therefor.

As explained in the above, in the present invention, the erase mark is superimposed on the given portion of the information unit, and the erase mark is detected in accordance with a mean level of the information reproducing signal at the given portion of the information unit and an existence of the information data at the given portion. Therefore, the erase mark can be correctly detected in a stable manner without being influenced by the content of the information data recorded on the sector or the recording method of the information data.

What is claimed is:

1. An erase mark detecting circuit for use in an optical information recording/reproducing apparatus, in which an erase mark, which is selectively superimposed on information data recorded in selected ones of unit information record areas of an optical information recording medium comprising a plurality of unit information record areas, is detected with the aid of a reproduction signal read out of said optical information recording medium, comprising:
   a level detecting means for detecting a mean level of said reproduction signal reproduced from a unit information record area of the optical information recording medium;
   an information data detecting means for processing the reproduction signal to detect a presence of information data recorded in the unit information record area; and
   an erase mark detecting means for providing a signal indicating detection of an erase mark superimposed on said unit information record area in accordance with a detection by said level detecting means that the means level of the reproduction signal is above a reference value and a detection by said information data detecting means of a said presence of information data in said selected unit information record area.

2. An erase mark detecting circuit according to claim 1, wherein:
   said information data detecting means detects the presence of information data at a center portion of said unit information record area; and
   said erase mark detecting means detects said erase mark after the presence of information data has been detected, but before an end of the unit information record area.

3. An erase mark detecting circuit according to claim 1, wherein:
   said level detecting means comprises a filter for removing an unnecessary frequency component of said reproduction signal to detect said mean level of said reproduction signal and a comparator for comparing an output of said filter with said reference value and producing an output signal when the mean level of said reproduction signal exceeds said reference value.

4. An erase mark detecting circuit according to claim 2, wherein:
   said information data detecting means comprises a bivalent circuit for converting said reproduction signal to a bivalent signal, and a signal holding circuit for generating a detecting signal when it detects a presence of the bivalent signal and for holding said detection signal until the end of the unit information record area.

5. An erase mark detecting circuit according to claim 1, wherein:
   said erase mark detecting means comprises a unit information record area detecting circuit for detecting that the unit information record area is started therefrom on a basis of said reproduction signal; window generating means for generating first and second window signals, wherein during said first window signal said information data signal recorded on the unit information record area is detected by said information data detecting means; and a first AND circuit to which an output of said level detecting means, an output of said information data detecting means and said second window signal are supplied to produce an erase mark detecting signal.

6. An erase mark detecting circuit according to claim 3, wherein:
said filter is a low pass filter for removing a high frequency component of said information data reproducing signal to detect said mean level thereof.

7. An erase mark detecting circuit according to claim 4, wherein:
said signal holding circuit comprises a first flip-flop which is arranged to be set up at a trailing edge of the bivalent signal; and a second flip-flop which is connected to receive an output of said first flip-flop to hold an output of said first flip-flop until the end of the unit information record area.

8. An erase mark detecting circuit according to claim 5, wherein:
said window generating means comprises a first window generating circuit for generating the first window signal which becomes a first level at an intermediate portion of each of said unit information record areas and becomes a second level during a remaining period of each of said unit information record areas; and a second window generating circuit for generating the second window signal which becomes the first level in synchronization with a trailing edge of said first window signal.

9. An erase mark detecting circuit according to claim 8, wherein:
an output of said first flip-flop becomes a first level in synchronization with a trailing edge of a first bivalent signal generated by said bivalent circuit during a time when said first window signal is at said first level; said output of the first flip-flop is held in the second flip-flop at the trailing edge of the first window signal supplied from the first window generating circuit; and the second flip-flop is reset in synchronism with an output of the unit information record area detecting circuit.

10. An erase mark detecting circuit according to claim 6, in which:
said reference value is set such that the reference value is lower than an output level of the low pass filter on a data recorded unit information record area and on an erase mark recorded unit information record area but higher than an output of the low pass filter on a blank unit information record area.

11. An erase mark detecting circuit according to claim 4, wherein:
said information data detecting means further comprises a differentiating circuit for differentiating the reproduction signal before the reproduction signal is converted to the bivalent signal.

12. An erase mark detecting circuit according to claim 1, wherein:
said information data detecting means detects the presence of information data at said predetermined portion of a unit information record area; and said erase mark detecting means detects said erase mark after the presence of information data has been detected, but before an end of the unit information record area.

13. An erase mark detecting circuit according to claim 3, wherein:
said signal holding circuit comprises a first flip-flop which is arranged to be set up at a trailing edge of the bivalent signal; and a second flip-flop which is connected to receive an output of said first flip-flop to hold an output of said first flip-flop until the end of the unit information record area;
said erase mark detecting means comprises a unit information record area detecting circuit for detecting that the unit information record area is started therefrom on a basis of said reproduction signal; window generating means for generating first and second window signals, wherein during said first window signal said information data signal recorded on the unit information record area is detected by said information data detecting means; and a first AND circuit to which an output of said level detecting means, an output of said information data detecting means and said second window signal are supplied to produce an erase mark detecting signal; and
said level detecting means further comprises a third flip-flop, a fourth flip-flop and a second AND circuit; said output of said level comparator is supplied to terminals D of said third and fourth flip-flops, respectively; and said first window signal is supplied to a clock terminal of the third flip flop and an inverted signal of said first window signal is supplied to a clock terminal of the fourth flip-flop, respectively; and outputs of said third and fourth flip-flops are supplied to the first AND circuit via the second AND circuit.

14. An erase mark recording and detecting circuit for use in an optical information recording/reproducing apparatus, in which an erase mark, which is selectively superimposed on information data recorded in selected ones of unit information record areas of an optical information recording medium comprising a plurality of unit information record areas, is detected with the aid of a reproduction signal read out of said optical information recording medium, comprising:
an erase mark recording means for selectively recording an erase mark on a unit information record area of the optical information recording medium by employing a recording signal formed solely of a DC component for recording optical information on the optical information recording medium;
a level detecting means for detecting a mean level of said reproduction signal reproduced from said unit information record area of the optical information recording medium;
an information data detecting means for processing the reproduction signal to detect a presence of information data recorded in the unit information record area; and
an erase mark detecting means for providing a signal indicating detection of an erase mark superimposed on said unit information record area in accordance with a detection by said level detection means that the mean level of the reproduction signal detected is above a reference value and a detection by said information data detecting means of a said presence of information data in said selected unit information record area.

15. An erase mark recording and detecting circuit for use in an optical information recording/reproducing apparatus according to claim 14, wherein;

said erase mark is recorded on almost an entire extent of said unit information record area.

16. An optical information recording/reproducing apparatus, comprising:

an optical head comprising (a) a light source for producing a light beam for recording/reproducing optical information on an optical information recording medium including a plurality of unit information record areas and (b) a photodetector by which a reflection light beam reflected by the optical information recording medium is detected to produce an information data reproducing signal, wherein an erase mark is selectively superimposed on information data recorded in selected ones of said unit information record areas of said recording medium;

a power determining means for controlling a power of the light beam emanated from the light source;

an erase mark detecting circuit comprising a level detecting means for detecting a mean level of said information data reproducing signal; an information data detecting means for detecting that information data is recorded on one of the unit information record areas of the information recording medium; and an erase mark detection means for providing a signal indicating detection of an erase mark superimposed on said one of the information data recording areas in accordance with an output of said level detecting means indicating that the mean level of the reproduction signal is above a reference value and an output of said information data detecting means indicating a presence of information data in said one of said unit information recording areas.

17. An optical information recording/reproducing apparatus according to claim 16, wherein:

said power determining means comprises a reading power determining circuit, writing power determining circuit, an adding circuit and an adding controller;

an output of said reading power determining circuit and an output of said writing power determining circuit are added in said adding circuit under control of said adding controller to produce a light beam having a controllable writing power in said light source of said optical head.

18. An optical information recording/reproducing apparatus according to claim 17, further comprising:

an erase mark recording means for selectively recording the erase mark on the unit information record area of the optical information recording medium with the aid of a recording signal formed solely of a DC component for recording optical information on the optical information recording medium.

19. An erase mark detecting circuit according to claim 12, further comprising:

a counter for counting the number of pulses contained in the bivalent signal generated in the bivalent circuit; and wherein an output of the counter is supplied to the first flip-flop when a predetermined number of said pulses are counted by said counter, and said counting is conducted by said counter during a period when the output of said first window generating circuit is at a high level.

20. An erase mark detecting circuit according to claim 4, wherein:

said information data detecting means further comprises a counter for counting the number of pulses contained in the bivalent signal generated by the bivalent circuit; and an output of the counter is supplied to the first flip-flop when a predetermined number of said pulses are counted by said counter.

21. An erase mark detecting circuit according to claim 11, wherein:

said information data detecting means further comprises a counter for counting the number of pulses contained in the bivalent signal generated in the bivalent circuit; and an output of the counter is supplied to the first flip-flop when a predetermined number of said pulses are counted by said counter.

* * * * *